(12) United States Patent
Senda

(10) Patent No.: US 8,599,892 B2
(45) Date of Patent: Dec. 3, 2013

(54) LASER OSCILLATOR CONTROLLER

(75) Inventor: Takashi Senda, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 13/446,956

(22) Filed: Apr. 13, 2012

(65) Prior Publication Data

US 2012/0269217 A1   Oct. 25, 2012

(30) Foreign Application Priority Data

Apr. 20, 2011   (JP) ................ 2011-093684

(51) Int. Cl.
*H01S 3/00* (2006.01)
*H01S 3/13* (2006.01)
(52) U.S. Cl.
USPC .......... 372/38.02; 372/29.021; 372/38.1

(58) Field of Classification Search
USPC .............. 372/38.02, 29.021, 38.1
See application file for complete search history.

(56) References Cited

U.S. PATENT DOCUMENTS 6,850,549 B2   2/2005  Takigawa et al.

FOREIGN PATENT DOCUMENTS

| JP | 63157776 | * 6/1988 |
| JP | 2003-037316 | 2/2003 |

* cited by examiner

*Primary Examiner* — Armando Rodriguez
(74) *Attorney, Agent, or Firm* — Adli Law Group P.C.

(57) ABSTRACT

Provided is a method for controlling a laser oscillator. Such a laser oscillator is applicable to a laser processing machine and includes a plurality of oscillator modules each adapted to be driven to oscillate a laser beam. Also, such a laser oscillator is configured to collect laser beams oscillated by driven modules for output. The method includes determining the number of modules to be driven, of the plurality of oscillator modules.

5 Claims, 5 Drawing Sheets

LASER OSCILLATOR CONTROLLER

CROSS REFERENCE TO THE RELATED APPLICATION

This application is based on and claims priority to Japanese patent application No. 2011-093684, filed on Apr. 20, 2011, the entire disclosure of which is herein incorporated by reference as a part of this application.

FIELD OF THE INVENTION

The present invention relates to a controller for controlling a laser oscillator that is applicable to a laser processing machine that processes, for to example, sheet metals.

BACKGROUND OF THE INVENTION

A laser oscillator for laser processing application may include a couple of oscillator modules each operable to oscillate a laser beam, so that the laser beams oscillated by these oscillator modules can be collected for output. Each of such oscillator modules by itself can adequately provide for a laser oscillator, as well. Such oscillator modules are often combined to provide for a laser oscillator of a significant output that cannot be achieved with a single oscillator module, and a number of the oscillator modules may be employed according to the required output power of the laser oscillator. In sheet metals cutting application, for example, a large number of oscillator modules are associated with a laser processing machine to meet the demand for a greater cutting capability.

Conventionally, to adjust the output power of a laser oscillator that includes a plurality of oscillator modules, control is applied such that all of the oscillator modules are adjusted by the same proportions. For example, to adjust the output power of a laser oscillator to 50% of its maximum rated output, control is applied such that all of the output powers of the oscillator modules are regulated to 50% of their maximum rated output (see JP Laid-open Patent Publication No. 2003-037316).

When the output power of a laser oscillator is set low relative to its maximum rated output, a laser processing operation becomes unstable. Normally this is due to poor control resolution of the output of a laser oscillator; for example, control of a laser oscillator within the range of less than 10% of its maximum rated output is very difficult. This, in turn, makes it difficult to perform fine adjustment of its output in response to changes in the designated value for the output power that occur during a laser processing operation. In this way, considerable output fluctuations may occur during the processing operation. As such, fine adjustment is difficult and stable processing quality cannot be achieved. This also applies to a laser oscillator including oscillator modules whose output powers can be designated to select levels. A laser processing operation stabilizes when the designation is to a higher output power (e.g., 40% of the maximum rated output), better than when the designation is to a lower output power (e.g., 10% of the maximum rated output).

In laser cutting of a sheet metal, a correct curve shape requires the movement of a laser beam at a speed lower than when cutting a linear shape. When moving a laser beam at a lower speed, it may be necessary to reduce the laser output power because otherwise the heat input from the laser beam into a material undesirably increases. However, the aforementioned limit on the fine adjustment capability does not allow for regulation of the laser output power to a proper level. The resulting overheating or inadequate heat input jeopardizes a stable processing operation.

SUMMARY OF THE INVENTION

An object of the present invention is to provide a controller for controlling a laser oscillator, which allows for fine adjustment of the output of the laser oscillator as a whole, without modifying the oscillator modules at all.

Provided are controller and method for controlling a laser oscillator, with the laser oscillator being applicable to a laser processing machine, the laser oscillator including a plurality of oscillator modules each adapted to be driven to oscillate a laser beam, and the laser oscillator being configured to collect laser beams oscillated by driven modules for output of the laser processing machine, where the controller and method provide for determining the number of modules to be driven, of the plurality of oscillator modules.

Determining the number of modules to be driven allows for reducing the number of oscillator modules to be driven when a low output power is desired. In other words, not all of the oscillator modules have to be driven, and driven modules will be appropriately controlled. In this way, fine control of the output power of a laser oscillator as a whole can be carried out. As a simple example, it is assumed that a laser oscillator includes two oscillator modules and that the output power of each oscillator module can be controllably adjusted by increments or decrements of 10%. Here, when the two oscillator modules operate at the same output powers, the output power of the laser oscillator as a whole can only be adjusted by increments or decrements of 10%. In contrast, when only one of the two oscillator modules is driven and the output power of that particular oscillator module is controllably adjusted by increments or decrements of 10%, then the output power of the laser oscillator as a whole can be adjusted by increments or decrements of 5%. Accordingly, fine adjustment of the output power of a laser oscillator as a whole can be carried out without requiring the use of an oscillator module with a finely controllable output power. Also, the output of an oscillator module normally stabilizes better when it operates at a higher output power, than when it operates at a lower output power. Therefore, driving a smaller number of oscillator modules and designating higher output powers for their operation not only allow for fine adjustment of the output power of the laser oscillator as a whole but also lead to stabilization of the laser output power, which in turn results in a stable laser processing operation. Furthermore, in the case of a laser oscillator whose oscillator modules do not have respective power adjustment capabilities, determining the number of modules to be driven of the plurality of modules enables adjustment of the output power of such a laser oscillator as a whole.

In the present invention, determining the number of modules to be driven may include: calculating a minimum number of the modules to be driven, based on a required power of the output of the laser processing machine to perform a given laser processing operation; and determining the number of the modules to be driven, according to defined criteria.

This allows for choosing the number of the modules to be driven that is appropriate for a required output power of the laser processing machine to perform a given laser processing operation. Thus, a user himself or herself does not have to take current conditions into account and switch the number of driven modules accordingly. Furthermore, by selecting the criteria appropriately, the oscillator modules may be driven in an advantageous number that achieves more effective control of the output power of the laser oscillator.

The defined criteria may include a criterion requiring that control resolution of an output of the laser oscillator increase by no less than a predetermined proportion when the minimum number of the oscillator modules is/are driven, and the number of the modules to be driven may be set to the minimum number if the criterion is met.

Depending on the required output power of the laser oscillator, reducing the number of the modules to be driven may not lead to a meaningful increase in control resolution of an output power of the laser oscillator. In such a case, reducing the number of the modules to be driven only leads to a biased use among the oscillator modules, and this may result in reduced durability of the laser oscillator. On the other hand, by reducing the number of the modules to be driven only when the resolution increases by no less than a predetermined proportion, such reduction of durability due to a biased use among the oscillator modules can be prevented.

The number of the modules to be driven may be set to all of the plurality of oscillator modules if the aforementioned criterion is not met.

A computer readable data storage medium may be provided which includes an instruction that causes a computer to perform the step of controlling the laser oscillator, and the step of controlling the laser oscillator may include determining the number of modules to be driven of the plurality modules.

Any combination of at least two configurations disclosed in the claims and/or specification and/or drawings is included in the present invention. In particular, any combination of two or more claims is included in the present invention.

BRIEF DESCRIPTION OF THE DRAWINGS

The prevent invention will be more apparent from the following description of preferred embodiments, as illustrated in the accompanying drawings in which like reference characters refer to the same parts throughout the different views. Note that the embodiments herein and the drawings are merely for exemplary and illustration purposes, and should not be taken as limiting the scope of the invention.

DETAILED DESCRIPTION OF THE EMBODIMENTS

Figure 1:
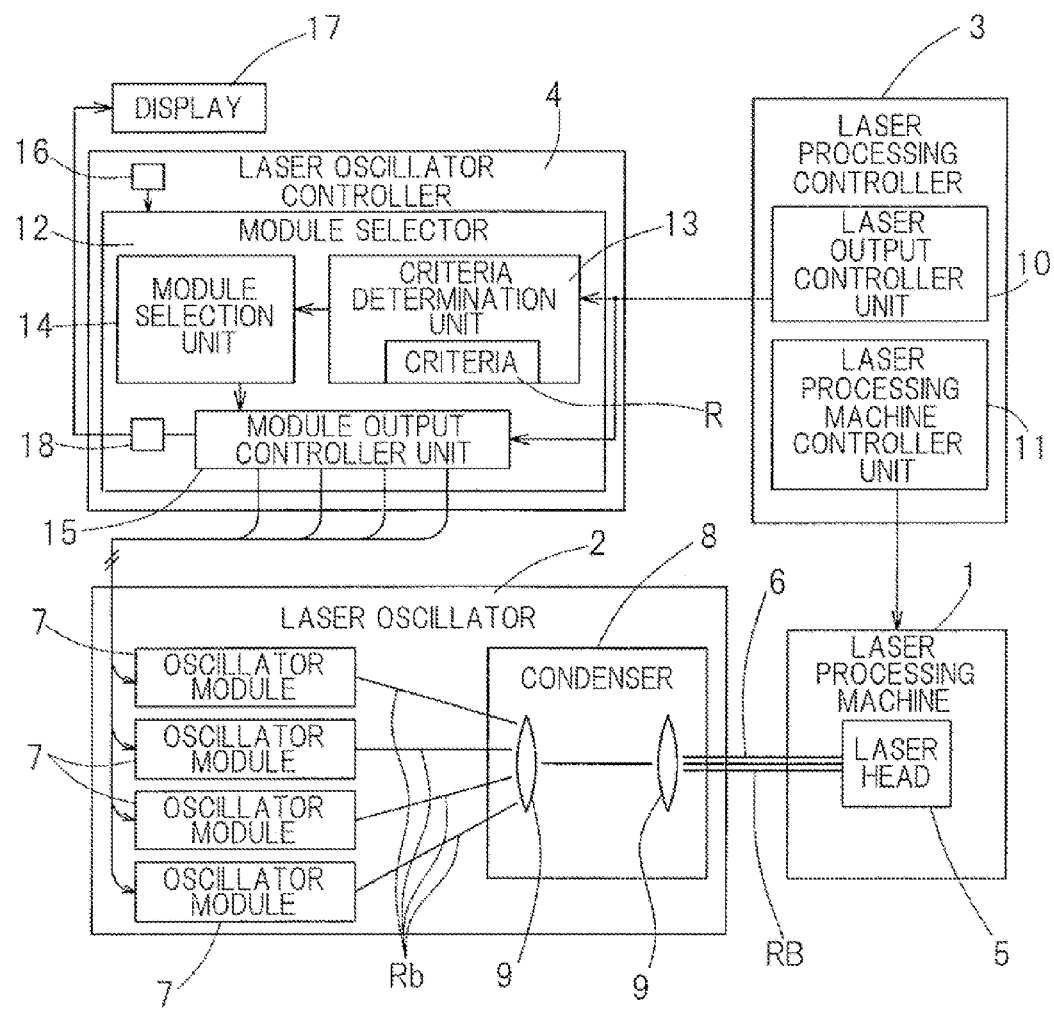
FIG. 1 shows a block diagram of a schematic configuration of a laser processing system that includes a controller for controlling a laser oscillator according to an embodiment of the present invention.

An embodiment of the present invention will be described in connection with FIGS. 1 to 3. FIG. 1 shows a block diagram of a schematic configuration of a laser processing system in its entirety. The laser processing system may include a laser processing machine 1, a laser oscillator 2, a laser processing controller 3 that controls the laser processing machine 1, and a laser oscillator controller 4 that controls the laser oscillator 2. The laser processing machine 1 may include, for example, a laser cutting machine for cutting sheet materials, a laser engraving machine for engraving patterns or markings, a laser drilling machine for drilling holes in a substrate, a laser ablation machine for ablating off the outer surface of a solid object, a laser welding machine for performing a laser welding operation, etc. The laser processing machine 1 may include a laser head 5 that directs a laser beam to a workpiece (not shown). If the laser processing machine 1 includes a laser cutting machine for cutting sheet materials, the laser processing machine 1 may also include a carrier mechanism (not shown) that causes a relative movement between the laser head 5 and a workpiece. The carrier mechanism (not shown) may move the laser head 5 relative to a fixedly positioned workpiece, or move a workpiece relative to the laser head 5 with the laser head 5 being fixedly positioned.

The laser oscillator 2 may produce a laser beam RB which may be guided via a light guide path 6 to the laser head 5 of the laser processing machine 1. The light guide path 6 may include an optical fiber or a conduit.

The laser oscillator 2 includes a plurality of oscillator modules 7 each adapted to be driven to oscillate a laser beam Rb. The laser oscillator 2 may include a condenser 8 that collects laser beams Rb oscillated by at least one of the oscillator modules 7 to generate a single laser beam RB which is outputted through the laser head 5 in the laser processing machine 1. Although each of the oscillator modules 7 by itself can adequately provide for a laser oscillator 2, in the embodiment under discussion a plurality of the oscillator modules 7 are combined such that a laser oscillator 2 can achieve the required maximum rated output. Also, in the embodiment under discussion, all of the oscillator modules 7 have the same maximum rated outputs.

Each of the oscillator modules 7 may be configured to generate a laser beam Rb that can process materials such as metals. The oscillator modules 7 may include, as a light excitation source, a solid laser such as a fiber laser. The oscillator modules 7 may include, as an oscillator source, a semiconductor laser. Such a semiconductor laser may include a plurality (e.g., tens or hundreds) of excitation light sources. In one embodiment not shown, at least one of the oscillator modules 7 includes, in addition to an excitation light source, a condenser and/or an amplifier. Also, each of the oscillator modules 7 may have output power adjustment capability:

The laser processing controller 3 may include a laser output controller unit 10 and a laser processing machine controller unit 11. The laser output controller unit 10 may be configured to produce a control signal that is sent to the laser oscillator controller 4 for control of laser output. The control signal may indicate a required laser output power to perform a given laser processing operation. The laser processing machine controller unit 11 may be configured to control the laser processing machine 1. The laser processing controller 3 may be configured to interpret and execute a laser processing program (not shown) to generate information that is sent to the laser processing machine 1 and/or the laser oscillator controller 4 for proper control. The laser processing controller 3 may include a computerized numerical controller and a programmable controller.

The laser oscillator controller 4 may control the output power of the laser oscillator 2 as well as on/off of the laser oscillator 2. The laser oscillator controller 4 may include a computer such as a microcomputer, a program for control of the computer, and electronic circuitry. The laser oscillator controller 4 includes a module selector 12 that determines the number of modules 7 to be driven and to select, from all of the plurality of oscillator modules 7, the modules 7 to be driven. The module selector 12 may include a criteria determination unit 13, a module selection unit 14, and a module output controller unit 15. The criteria determination unit 13 may be configured to calculate a minimum number of the modules 7 to be driven, based on the designated value for the output power of the laser processing machine 1 to perform a given laser processing operation (i.e., a required output power of the laser processing machine 1 to perform a given laser processing operation), and to determine the number of the modules 7 to be driven of the plurality of modules 7, according to defined criteria R. The criteria determination unit 13 may be further configured to select, from all of the plurality of oscillator modules 7, the modules 7 to be driven, i.e., which of the oscillator modules 7 to be driven. The designated value for the output of the laser processing machine 1 to perform a given laser processing operation may be sent to the criteria determination unit 13 via the laser output controller unit 10 of the laser processing controller 3. The phrase "a minimum number of the modules 7 to be driven" used herein refers to the minimum number of the oscillator modules 7 necessary to satisfy the designated value for the output power of the laser processing machine 1 to perform a given laser processing operation.

The module selection unit 14 may be configured to generate a signal, upon receipt of which the module output controller unit 15 drives the oscillator modules 7 selected by the criteria determination unit 13. The module output controller unit 15 may be configured to control the oscillator modules 7 such that the sum of the output powers of the selected modules 7 reach the designated value for the laser output to perform a given laser processing operation, by adjusting the laser outputs of the selected oscillator modules 7 and/or switching off the selected oscillator modules 7.

The defined criteria R that may be used by the criteria determination unit 13 may include a criterion, for example, requiring that control resolution of an output of the laser oscillator 2 increase by no less than a predetermined proportion when the minimum number of the oscillator modules 7 is/are driven, and the criteria determination unit 13 may reduce the number of the modules 7 to be driven, that is, may limit the modules 7 to be driven to some modules 7 in the laser oscillator 2, when the criterion is met. A more particular example of the defined criteria R as well as a more particular flow of operation of the module selector 12 will be described later.

As such, the module selector 12 can determine the number of modules 7 to be driven. This allows for driving only some of the oscillator modules 7 in the laser oscillator 2 when a low output power is desired. In other words, not all of the oscillator modules 7 have to be driven, and driven modules 7 will be appropriately controlled. In this way, fine control of the output power of the laser oscillator 2 as a whole can be carried out. In the illustrated example, it is assumed that a laser oscillator includes four oscillator modules 7 and that the output power of each oscillator module 7 can be controllably adjusted by increments or decrements of 10%. Here, when the four oscillator modules 7 operate at the same output powers, the output power of the laser oscillator 2 as a whole can only be adjusted by increments or decrements of 10%. In contrast, when only one of the four oscillator modules 7 is driven and the output power of that particular oscillator module 7 is controllably adjusted by increments or decrements of 10%, then the output power of the laser oscillator 2 as a whole can be adjusted by increments or decrements of 2.5%. Accordingly, fine adjustment of the output power of the laser oscillator 2 as a whole can be carried out without requiring the use of an oscillator module 7 with a finely controllable output power. Furthermore, even in the case of a laser oscillator whose oscillator modules 7 do not have respective power adjustment capabilities (i.e., a laser oscillator 2 whose oscillator modules 7 can only be on/off switched), adjustment of the output power of the laser oscillator 2 as a whole can be carried out, with a plurality of adjustment levels being possible (four adjustment levels—namely, FULL, ¾, ½, and ¼ output power—in the above example).

The provision of the criteria determination unit 13 allows for choosing the number of the modules 7 to be driven that is appropriate for a required output power of the laser processing machine 1 to perform a given laser processing operation. Thus, a user himself or herself does not have to take current conditions into account and switch the number of driven modules accordingly. Furthermore, by selecting the defined criteria R appropriately, the oscillator modules 7 can be driven in an advantageous number that achieves more effective control of the output power of the laser oscillator 2.

Also, the defined criteria R that may be used by the criteria determination unit 13 may include a criterion requiring that control resolution of an output of the laser oscillator 2 increase by no less than a predetermined proportion when the minimum number of the oscillator modules 7 is/are driven, and the criteria determination unit 13 may reduce the number of the modules 7 to be driven if the criterion is met. In one embodiment, the criteria determination unit 13 may be configured to set the number of the modules 7 to be driven to the minimum number if the criterion is met. The following advantages can be achieved: depending on the desired output power of the laser oscillator 2, reducing the number of the modules 7 to be driven may not lead to a meaningful increase in control resolution of an output power of the laser oscillator 2. In such a case, reducing the number of the modules 7 to be driven only leads to a biased use among the oscillator modules 7, and this may result in reduced durability of the laser oscillator 2. On the other hand, by reducing the number of the modules 7 to be driven only when the resolution increases by no less than a predetermined proportion, such reduction of durability due to a biased use among the oscillator modules 7 can be prevented.

Also, the output of an oscillator module 7 normally stabilizes better when it operates at a higher output power, than when it operates at a lower output power. Therefore, driving a smaller number of oscillator modules 7 and designating higher output powers for their operation not only allow for fine adjustment of the output power of the laser oscillator 2 as a whole but also lead to stabilization of the laser output power of the laser oscillator 2 as a whole, which in turn results in a stable laser processing operation.

Preferably, the laser oscillator controller 4 includes a mode switcher 16 that switches the laser oscillator controller 4 between a normal mode and a stabilization mode. In a normal mode, in a similar way to a conventional laser oscillator, the laser oscillator 2 may be controlled such that all of the oscillator modules 7 of the laser oscillator 2 will have the approximately same outputs. In a stabilization mode, on the other hand, the module selector 12 may set the number of the modules 7 to be driven to the aforementioned minimum number. Preferably, the laser oscillator controller 4 includes a screen output unit 18 that presents to the screen of a display 17 whether the laser oscillator controller 4 is in a normal mode or a stabilization mode as well as the controlled output powers of the respective oscillator modules 7. The display 17 may include, for example, a liquid crystal display associated with a control panel.

FIGS. 2A to 2F show examples of a displayed image presented by the screen output unit 18. In the illustrated example, each of four oscillator modules 7 has a maximum rated output of 500 W, resulting in a total of 2,000 W maximum rated output for a laser oscillator 2. The four bars shown in each of the figures represent the outputs of the respective oscillator modules 7. The hatched portions in the bars indicate the current output powers of the respective oscillator modules 7. Of the three arrows on the left side of the four bars in each of the figures, the one having the greatest length indicates the average output power (W) of the modules that are being monitored. The term "average output power" used herein refers to the average magnitude of the output powers of driven oscillator modules.

Figure 2A:
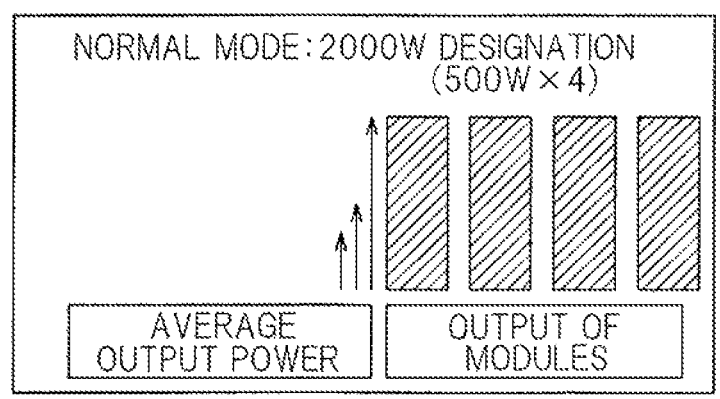
FIG. 2A shows an example of a monitor screen displaying the outputs of respective oscillator modules in a laser oscillator controlled by a controller such as that of FIG. 1, operating in a normal mode such that the laser oscillator produces a required output of 2,000 W.
Figure 2B:
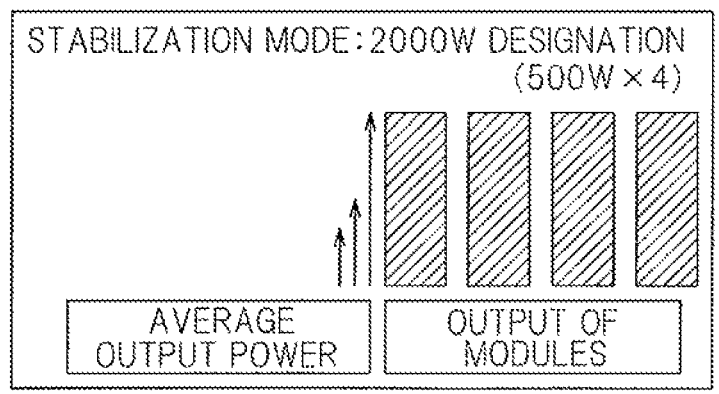
FIG. 2B shows an example of a monitor screen displaying the outputs of respective oscillator modules in the laser oscillator controlled by a controller such as that of FIG. 1, operating in a stabilization mode such that the laser oscillator produces a required output of 2,000 W.

In the illustrated example, when the laser processing controller 3 sends to the laser oscillator controller 4 (FIG. 1) a designated value of 2,000 W for the output power, all of the oscillator modules 7 operate at their maximum output powers both in a normal mode and in a stabilization mode, as shown in FIG. 2A and FIG. 2B, respectively.

Figure 2C:
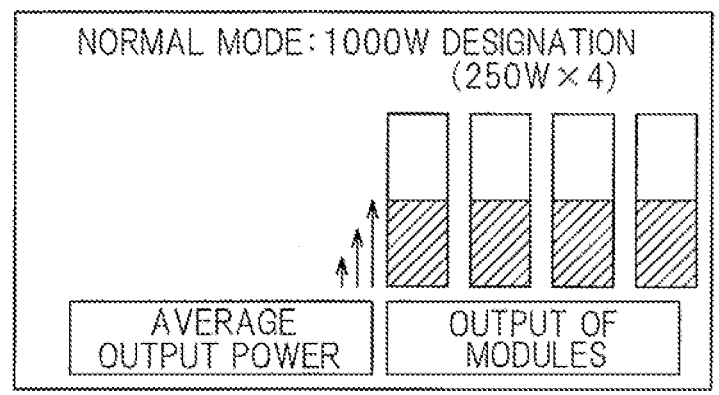
FIG. 2C shows an example of a monitor screen displaying the outputs of respective oscillator modules in the laser oscillator controlled by a controller such as that of FIG. 1, operating in a normal mode such that the laser oscillator produces a required output of 1,000 W.
Figure 2D:
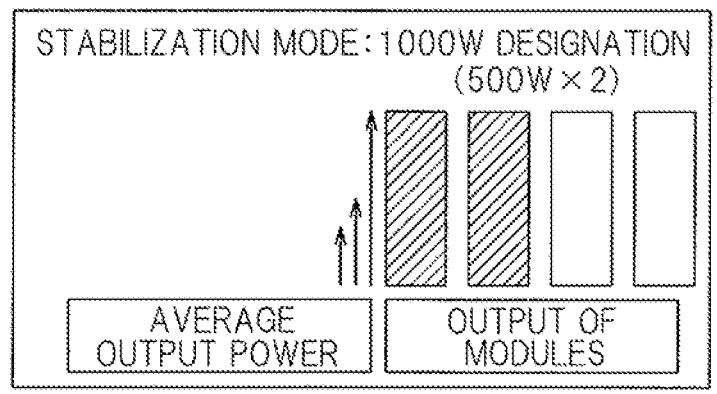
FIG. 2D shows an example of a monitor screen displaying the outputs of respective oscillator modules in the laser oscillator controlled by a controller such as that of FIG. 1, operating in a stabilization mode such that the laser oscillator produces a required output of 1,000 W.

When the laser processing controller 3 (FIG. 1) specifies a designated value of 1,000 W for the output power, in a normal mode all of the oscillator modules 7 operate at ½ of their maximum rated outputs, such as shown in FIG. 2C. In a stabilization mode, on the other hand, the oscillator modules 7 are controlled such that two of the oscillator modules 7 operate at their maximum output powers and the remaining two oscillator modules 7 operate at zero output powers, such as shown in FIG. 2D.

Figure 2E:
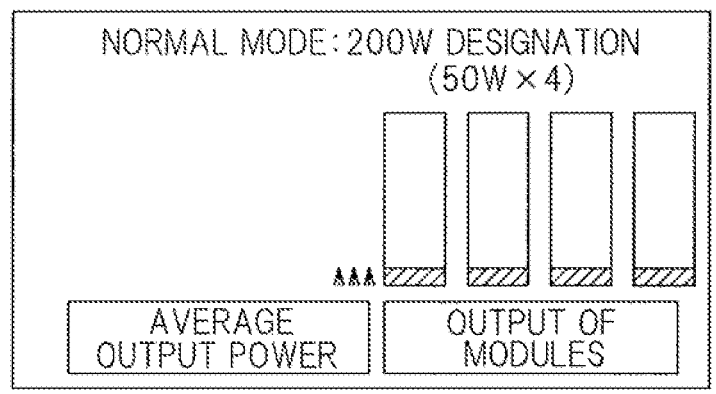
FIG. 2E shows an example of a monitor screen displaying the outputs of respective oscillator modules in the laser oscillator controlled by a controller such as that of FIG. 1, operating in a normal mode such that the laser oscillator produces a required output of 200 W.
Figure 2F:
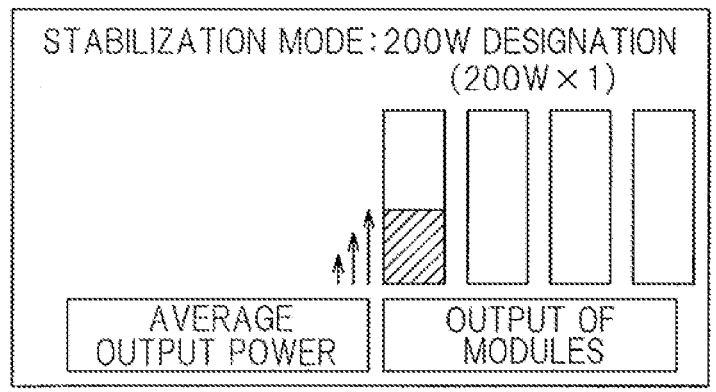
FIG. 2F shows an example of a monitor screen displaying the outputs of respective oscillator modules in the laser oscillator controlled by a controller such as that of FIG. 1, operating in a stabilization mode such that the laser oscillator produces a required output of 200 W.

When the laser processing controller 3 (FIG. 1) specifies a designated value of 200 W for the output power, in a normal mode all of the oscillator modules 7 operate at 1/10 of their maximum rated outputs (i.e., 50 W per module), such as shown in FIG. 2E. In a stabilization mode, on the other hand, the oscillator modules 7 are controlled such that only one of the oscillator modules 7 is driven to operate at an output power of 200 W, such as shown in FIG. 2F.

In the illustrated example, both a normal mode and a stabilization mode are operable. However, when it is assumed that the laser processing controller 3 (FIG. 1) specifies a designated value of 100 W for the output power and that the lower limit of the controllable output of an oscillator module 7 is 1/10 of its maximum rated output power of 500 W (i.e., 50 W), a normal mode cannot be used since each of the four oscillator modules 7 has to operate at an output power of 25 W. The defined criteria R that may be used by the criteria determination unit 13 may include a criterion that the number of the modules to be driven be reduced when a required output power cannot be achieved in a normal mode, and the number of the modules 7 to be driven may be reduced accordingly if that criterion is met.

In the illustrated example where the laser oscillator 2 has a maximum laser output of 2,000 W, a processing requirement of 1,000 W output results in a designated value of ½ of the maximum rated output of a laser oscillator 2. A conventional laser oscillator would be controlled, in a similar way to a normal mode, such that all of the four oscillator modules 7 are selected (driven). In such a case, the designated value is 50% of the output for each of the oscillator modules 7. In contrast, in a configuration that allows for selecting the number of the modules 7 to be driven, two of the oscillator modules 7 may be selected and driven each with the designated output of 100%, allowing for more stabilized control of the output power of the laser oscillator 2.

In particular, while a cutting operation requires a higher output power, operations such as laser marking and laser scribing operations require a lower output power. For instance, a laser cutting operation may require a higher output power of 2,000 W, while a laser marking operation may require a much lower power of 200 W. In the latter case, the designated output value for each of the oscillator modules 7 will be equal to or less than 10% of its maximum rated output, making it difficult to perform a stable processing operation. In contrast, by setting the number of the modules 7 to be driven to one, for example, the designation of 40% of its maximum rated output will be given to this particular to oscillator module 7. Thus, the designated value for the output power of an oscillator module 7 will increase by four folds with respect to a conventional configuration, thereby resulting in increased stability.

Figure 3:
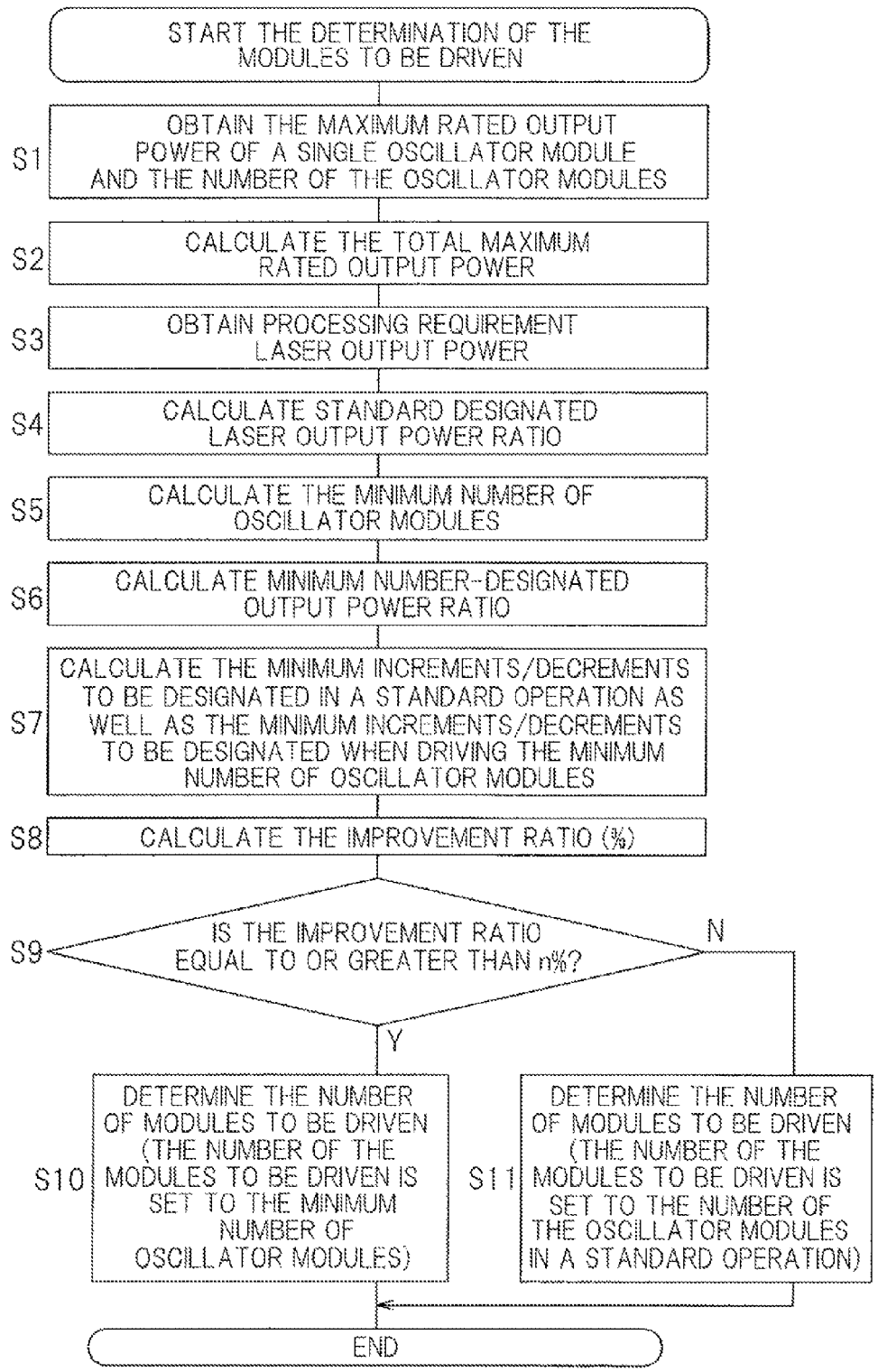
FIG. 3 shows a flow chart of steps performed by a module selector of the controller such as that of FIG. 1.

FIG. 3 shows a flow chart of steps performed by the module selector 12 of the controller such as that of FIG. 1. First, data indicative of the maximum rated output power of a single oscillator module 7 as well as the number of the equipped oscillator modules 7, that is, the number of the plurality of oscillator modules, are sent to the module selector 12 via, for example, an operator's input (Step S1). Based on the data, the module selector 12 calculates the total maximum rated output power (Step S2); more specifically, "the maximum rated output power of a single oscillator module 7" is multiplied by "the number of the equipped oscillator modules 7" to calculate the maximum rated output power of a laser oscillator 2 as a whole, i.e., the total maximum rated output power which is the sum of the maximum rated output powers of all of the oscillator modules 7.

Next, the module selector 12 receives from the laser processing controller 3 a laser output power segment of a processing requirement data, which specifies a required output power to perform a given laser processing operation (which is hereinafter referred to as "a processing requirement laser output power") (Step S3). Based on the received processing requirement laser output power, the module selector 12 goes on to calculate the ratio of "the processing requirement laser output power" to "the total maximum rated output power"—that is, (the processing requirement laser output power)/(the total maximum rated output power) (Step S4). This ratio is hereinafter referred to as "a standard designated laser output power ratio".

In Step S5, the minimum number of oscillator modules 7 is calculated which can achieve the processing requirement laser output power specified by the data received in Step S3. This minimum number is "the processing requirement laser output power" divided by "the maximum rated output power of a single oscillator module". The equation is defined as: "the minimum number of oscillator modules 7"=(the processing requirement laser output power)/(the maximum rated output power of a single oscillator module 7). When the above equation produces a value that includes a fractional part such as "2.5", the value is rounded up to the nearest integer—that is, its fractional part is considered as 1 and the integer part is incremented by 1. Therefore, in the above example, the calculated value of "2.5" will be rounded up to "3".

In Step S6, based on the minimum number of oscillator modules calculated in Step S5, the "minimum number-designated output power ratio" is calculated; more specifically, "the maximum rated output power of a single oscillator module" is multiplied by "the minimum number of oscillator modules". The resulting value is used to divide "the processing requirement laser output power" in order to calculate "the minimum number-designated output power ratio". The equation is defined as: "the minimum number-designated output power ratio"=(the processing requirement laser output power)/((the maximum rated output of a single oscillator module)×(the minimum number of oscillator modules)).

In Step S7, the minimum increments or decrements to be designated of the output power of a laser oscillator—that is, the minimum acceptable increments or decrements of the output power of a laser oscillator—, which corresponds to the resolution of the output power of a laser oscillator, are calculated; more specifically, the minimum increments or decrements to be designated in a standard operation as well as the minimum increments or decrements to be designated when driving the minimum number of oscillator modules are calculated. If it is assumed that the minimum increments or decrements to be designated of the output power (i.e., the resolution of the output power) for each of the oscillator modules is ¹⁄₁₀₀ of its maximum rated output power, the following relations hold:

(the minimum increments or decrements to be designated in a standard operation)=(the total maximum rated output power)/100

(the minimum increments or decrements to be designated when driving the minimum number of oscillator modules)=((the maximum rated power of a single oscillator module)×(the minimum number of oscillator modules))/100

In the embodiment under discussion, the increments or decrements to be designated in a standard operation are the same as the increments or decrements to be designated when operating all of the oscillator modules 7 at the approximately same output powers. In the embodiment under discussion, the minimum increments or decrements to be designated when driving the minimum number of oscillator modules are the same as the increments or decrements to be designated when operating the minimum number of the oscillator modules 7 at the approximately same output powers.

In Step S8, the improvement ratio in % (i.e., by how much proportion control resolution of the output power of a laser oscillator would increase) is calculated with the following equation:

(improvement ratio)=[(the minimum increments or decrements to be designated in a standard operation)/(the minimum increments or decrements to be designated when driving the minimum number of oscillator modules)]×100

In Step S9, it is determined whether the defined criteria R are met; more specifically, it may be determined whether the improvement ratio (in %) is no less than a predetermined proportion (n %). When n is 400, for instance, it is determined whether the improvement ratio shows no less than a four-fold improvement with respect to a standard operation. The improvement ratio being no less than a predetermined proportion means that the resolution of the output power of a laser oscillator increases by no less than the predetermined proportion.

When the improvement ratio (in %) is no less than a predetermined proportion (n %), it proceeds to Step S10. When the improvement ratio (in %) is less than a predetermined proportion (n %), on the other hand, it proceeds to Step S11. In one of Step S10 and Step S11, the number of modules to be driven is determined. When it proceeds to Step S10, the number of the modules to be driven is set to the minimum number of oscillator modules which is calculated in Step S5. When it proceeds to Step S11, the number of the modules to be driven is set to the number of the oscillator modules driven in a standard operation, e.g., all of the plurality oscillator modules in the laser oscillator.

In FIG. 3, Step S3 through Step S9 are performed by a criteria determination unit 13 such as that of FIG. 1, while Step S 10 and Step S11 are performed by a module selection unit 14 such as that of FIG. 1.

Tables 1 to 3 below show various examples of improvement achieved by driving a select number of oscillator modules 7, where the outputs and the number of the equipped oscillator modules 7 differ from one example to another. The values shown in Tables 1 to 3 are calculated according to the flow chart of FIG. 3. In these examples, it is assumed that the minimum increments or decrements of the controllable output of an oscillator module are ¹⁄₁₀₀ of its maximum rated output.

TABLE 1

Example of Calculation results by a module selector (Case 1)

| 2000 W (500 W × 4 modules) Laser Oscillator | | | Standard | | | | Minimum Increments/Decrement (W) | | |
| --- | --- | --- | --- | --- | --- | --- | --- | --- | --- |
| Number of Modules | Single Module Maximum Rated Output | Total Maximum Rated Output | Processing Requirement Laser Output Power (W) | Designated Laser Output Power Ratio | Minimum Number of Modules | Minimum Number-designated Output Power Ratio | In Standard Operation | In Driving the Minimum Number of Modules | Improvement Ratio |
| 4 | 500 W | 2000 W | 2000 W | 100% | 4 | 100% | 20 W | 20 W | 100% |
| 4 | 500 W | 2000 W | 1200 W | 60% | 3 | 80% | 20 W | 15 W | 133% |
| 4 | 500 W | 2000 W | 1000 W | 50% | 2 | 100% | 20 W | 10 W | 200% |
| 4 | 500 W | 2000 W | 600 W | 30% | 2 | 60% | 20 W | 10 W | 200% |
| 4 | 500 W | 2000 W | 400 W | 20% | 1 | 80% | 20 W | 5 W | 400% |
| 4 | 500 W | 2000 W | 200 W | 10% | 1 | 40% | 20 W | 5 W | 400% |

TABLE 2

Example of Calculation results by a module selector (Case 2)

| 2400 W (600 W × 4 modules) Laser Oscillator | | | Standard | | | | Minimum Increments/Decrement (W) | | |
|---|---|---|---|---|---|---|---|---|---|
| Number of Modules | Single Module Maximum Rated Output | Total Maximum Rated Output | Processing Requirement Laser Output Power (W) | Designated Laser Output Power Ratio | Minimum Number of Modules | Minimum Number-designated Output Power Ratio | In Standard Operation | In Driving the Minimum Number of Modules | Improvement Ratio |
| 4 | 600 W | 2400 W | 2000 W | 83% | 4 | 83% | 24 W | 24 W | 100% |
| 4 | 600 W | 2400 W | 1200 W | 50% | 2 | 100% | 24 W | 12 W | 200% |
| 4 | 600 W | 2400 W | 1000 W | 42% | 2 | 83% | 24 W | 12 W | 200% |
| 4 | 600 W | 2400 W | 600 W | 25% | 1 | 100% | 24 W | 6 W | 400% |
| 4 | 600 W | 2400 W | 400 W | 17% | 1 | 67% | 24 W | 6 W | 400% |
| 4 | 600 W | 2400 W | 200 W | 8% | 1 | 33% | 24 W | 6 W | 400% |

TABLE 3

Example of Calculation results by a module selector (Case 3)

| 2000 W (500 W × 4 modules) Laser Oscillator | | | Standard | | | | Minimum Increments/Decrement (W) | | |
|---|---|---|---|---|---|---|---|---|---|
| Number of Modules | Single Module Maximum Rated Output | Total Maximum Rated Output | Processing Requirement Laser Output Power (W) | Designated Laser Output Power Ratio | Minimum Number of Modules | Minimum Number-designated Output Power Ratio | In Standard Operation | In Driving the Minimum Number of Modules | Improvement Ratio |
| 6 | 500 W | 3000 W | 2000 W | 67% | 4 | 100% | 30 W | 20 W | 100% |
| 6 | 500 W | 3000 W | 1200 W | 40% | 3 | 80% | 30 W | 15 W | 200% |
| 6 | 500 W | 3000 W | 1000 W | 33% | 2 | 100% | 30 W | 10 W | 300% |
| 6 | 500 W | 3000 W | 600 W | 20% | 2 | 60% | 30 W | 10 W | 300% |
| 6 | 500 W | 3000 W | 400 W | 13% | 1 | 80% | 30 W | 5 W | 600% |
| 6 | 500 W | 3000 W | 200 W | 7% | 1 | 40% | 30 W | 5 W | 600% |

In particular, Table 1 (Case 1) concerns four oscillator modules 7 each having a maximum rated output power of 500 W. Here, the minimum increments or decrements of the output power to be designated, i.e., the resolution of the output power of a laser oscillator are 20 W when control is applied such that all of the oscillator modules 7 operate at the same outputs. On the other hand, by driving a select number of oscillator modules, that is, limiting the oscillator modules to be driven, the finest resolution is improved up to 5 W. The finest resolution of 5 W can be obtained when the processing requirement laser output power is one of 200 W and 400 W. The resulting improvement ratio is 400%.

Table 2 (Case 2) concerns four oscillator modules 7 each having a maximum rated output power of 600 W. Here, the minimum increments or decrements of the output power to be designated, i.e., the resolution of the output power of a laser oscillator are 24 W when control is applied such that all of the oscillator modules 7 operate at the same outputs. On the other hand, by driving a select number of oscillator modules, that is, limiting the oscillator modules to be driven, the finest resolution is improved up to 6 W. The finest resolution of 6 W can be obtained when the processing requirement laser output power is one of 200 W, 400 W and 600 W. The resulting improvement ratio is 400%. Table 3 (Case 3) concerns six oscillator modules 7 each having a maximum rated output power of 500 W. Here, the minimum increments or decrements of the output power to be designated, i.e., the resolution of the output power of a laser oscillator are 30 W when control is applied such that all of the oscillator modules 7 operate at the same outputs. On the other hand, by driving a select number of oscillator modules, that is, limiting the oscillator modules to be driven, the minimum increments or decrements to be designated, i.e., the finest resolution is improved up to 5 W. The finest resolution of 5 W can be obtained when the processing requirement laser output power is one of 200 W and 400 W. The resulting improvement ratio is 600%.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

[Reference Numerals]

1: LASER PROCESSING MACHINE
2: LASER OSCILLATOR
4: LASER OSCILLATOR CONTROLLER
7: OSCILLATOR MODULE
8: CONDENSER
12: MODULE SELECTOR
13: CRITERIA DETERMINATION UNIT
R: CRITERIA
RB, Rb: LASER BEAM

What is claimed is:

1. A method of controlling a laser oscillator applicable to a laser processing machine, comprising:
   a) determining number of modules to be driven for a laser oscillator having a plurality of oscillator modules each adapted to be driven to oscillate a laser beam, the laser oscillator being configured to collect laser beams oscillated by driven modules for output, wherein the step of determining the number of modules to be driven includes:
      calculating a minimum number of the modules to be driven, based on a required output power of the laser processing machine to perform a given laser processing operation;
      determining the number of the modules to be driven, according to defined criteria including a criterion requiring that control resolution of an output of the laser oscillator increase by no less than a predetermined proportion when the minimum number of the oscillator modules is/are driven; and
      setting the number of the modules to be driven to the minimum number if the criterion is met and setting the number of the modules to be driven to all of the plurality of oscillator modules if the criterion is not met.

2. A controller for controlling a laser oscillator applicable to a laser processing machine comprising a module selector configured to determine number of modules to be driven and to select from all of a plurality of the oscillator modules, the modules to be driven of the laser oscillator, the module selector including a criteria determination unit configured to calculate a minimum number of the modules to be driven, based on a required output power of the laser processing machine to perform a given laser processing operation, and to determine the number of the modules to be driven, according to defined criteria,
   said laser oscillator including the plurality of oscillator modules each adapted to be driven to oscillate a laser beam, the laser oscillator being configured to collect laser beams oscillated by driven modules for output, and
   the defined criteria used by the criteria determination unit including a criterion requiring that control resolution of an output power of the laser oscillator increase by no less than a predetermined proportion when the minimum number of the oscillator modules is/are driven, and the criteria determination unit is configured to set the number of the modules to be driven to the minimum number if the criterion is met and to set the number of the modules to be driven to all of the plurality of oscillator modules if the criterion is not met.

3. A computer readable data storage medium comprising an instruction that causes a computer to perform the step of:
   controlling a laser oscillator, the laser oscillator being applicable to a laser processing machine, the laser oscillator including a plurality of oscillator modules each adapted to be driven to oscillate a laser beam, the laser oscillator being configured to collect laser beams oscillated by driven modules for output;
   the step of controlling a laser oscillator including determining the number of modules to be driven, of the plurality of oscillator modules, wherein the step of determining the number of modules to be driven includes:
   calculating a minimum number of the modules to be driven, based on a required output power of the laser processing machine to perform a given laser processing operation;
   determining the number of the modules to be driven, according to defined criteria including a criterion requiring that control resolution of an output of the laser oscillator increase by no less than a predetermined proportion when the minimum number of the oscillator modules is/are driven; and
   setting the number of the modules to be driven to the minimum number if the criterion is met and setting the number of the modules to be driven to all of the plurality of oscillator modules if the criterion is not met.

4. The method as claimed in claim 1, wherein the laser processing machine includes one or more of the following: a laser cutting machine for cutting sheet materials, a laser engraving machine for engraving patterns or markings, a laser drilling machine for drilling holes in a substrate, a laser ablation machine for ablating off the outer surface of a solid object, or a laser welding machine for performing a laser welding operation.

5. The controller as claimed in claim 2, wherein the laser processing machine includes one or more of the following: a laser cutting machine for cutting sheet materials, a laser engraving machine for engraving patterns or markings, a laser drilling machine for drilling holes in a substrate, a laser ablation machine for ablating off the outer surface of a solid object, or a laser welding machine for performing a laser welding operation.

* * * * *